(12) United States Patent
Wei et al.

(10) Patent No.: US 11,520,730 B2
(45) Date of Patent: Dec. 6, 2022

(54) DATA TRANSFER SYSTEM, CIRCUIT, AND METHOD

(71) Applicant: REALTEK SEMICONDUCTOR CORPORATION, Hsinchu (TW)

(72) Inventors: Po-Lin Wei, Hsinchu (TW); Pi-Ming Lee, Hsinchu (TW); Chih-Chiang Yang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 127 days.

(21) Appl. No.: 17/218,209

(22) Filed: Mar. 31, 2021

(65) Prior Publication Data

US 2021/0318982 A1  Oct. 14, 2021

(30) Foreign Application Priority Data

Apr. 8, 2020  (TW) .................................. 109111815

(51) Int. Cl.
*G06F 15/173*  (2006.01)
*G06F 9/54*  (2006.01)
(Continued)

(52) U.S. Cl.
CPC .......... *G06F 15/17375* (2013.01); *G06F 5/12* (2013.01); *G06F 9/542* (2013.01); *G06F 15/7807* (2013.01)

(58) Field of Classification Search
CPC .. G06F 15/17375; G06F 15/7807; G06F 5/12; G06F 9/542
See application file for complete search history.

(56) References Cited

U.S. PATENT DOCUMENTS 10,178,018 B2   1/2019  Elad et al.
2011/0058422 A1* 3/2011  Warren .............. G11C 16/3495
                                               365/185.11
(Continued)

FOREIGN PATENT DOCUMENTS

CN    102184150 A    9/2011
CN    105814852 A    7/2016

OTHER PUBLICATIONS

OA letter of the counterpart TW application (appl. No. 109111815) mailed on May 27, 2021. Summary of the OA letter: Claims 1-5, 9-10 are rejected as being unpatentable over the cited reference 1 (CN 105814852 A, also published as US10178018B2) in view of the cited reference 2 (CN 102184150 A).

*Primary Examiner* — Henry Tsai
*Assistant Examiner* — John B Roche
(74) *Attorney, Agent, or Firm* — WPAT, PC

(57) ABSTRACT

Disclosed is a data transfer system capable of accelerating data transmission between two chips. The data transfer system includes: a master system-on-a-chip (SoC) including a master transmission circular buffer and a master reception circular buffer; and a slave SoC including a slave reception circular buffer and a slave transmission circular buffer. The slave/master reception circular buffer is a duplicate of the master/slave transmission circular buffer; accordingly, the write pointers of the two corresponding buffers are substantially synchronous and the read pointers of the two corresponding buffers are substantially synchronous as well. In light of the above, the read and write operations of the master/slave transmission circular buffer can be treated as the read and write operations of the slave/master reception circular buffer; therefore some conventional data reproducing procedure(s) for the data transmission can be omitted and the data transmission is accelerated.

20 Claims, 2 Drawing Sheets

(51) Int. Cl.
*G06F 5/12* (2006.01)
*G06F 15/78* (2006.01)

(56) References Cited

U.S. PATENT DOCUMENTS

2017/0256016 A1* 9/2017 Lee .......................... G06T 1/60
2019/0121738 A1* 4/2019 Ono ................... G06F 12/0831

* cited by examiner

DATA TRANSFER SYSTEM, CIRCUIT, AND METHOD

BACKGROUND OF THE INVENTION

1. Field of the Invention

The present disclosure relates to a data transfer system, circuit, and method, especially to a data transfer system, circuit, and method designed for data transmission between two chips.

2. Description of Related Art

A general Universal Serial Bus (USB) transmission process includes: a transmission-end (TX) program reproduces data and provides the reproduced data for a TX transmission layer; the TX transmission layer packs the reproduced data to generate a data package and sends the data package for a TX USB driver program; the TX USB driver program transmits the data package to a reception-end (RX); an RX USB driver program receives the data package and sends it to an RX transmission layer; and the RX transmission layer unpacks the data package and transmits the reproduced data of the data package to a target program. In the above process, the data are reproduced many times. In some applications (e.g., multimedia playback applications), each piece of data (e.g., data of an 8K image frame) should be delivered to a target program (e.g., a multimedia playback program) in time, or else a lag problem will occur. If the data amount of each piece of data is large and a TX and RX are not included in the same system-on-a-chip (SoC), the TX and RX cannot share the same memory space and the lag problem often occurs. In consideration of the above, this technical field needs a more efficient way to realize data transmission between SoCs.

SUMMARY OF THE INVENTION

An object of the present disclosure is to provide a data transfer system, circuit, and method capable of transmitting data between chips efficiently.

An embodiment of the data transfer system of the present disclosure is capable of accelerating data transmission between a master system-on-a-chip (SoC) of the data transfer system and a slave SoC of the data transfer system. The master SoC includes a master transmission circular buffer and a master reception circular buffer, and the slave SoC includes a slave reception circular buffer and a slave transmission circular buffer. The master transmission circular buffer is configured to receive master-end data from a master-end upper-layer circuit (e.g., a video decoding circuit) of the master SoC and accordingly update a master transmission buffer write pointer, and to update a master transmission buffer read pointer according to an update notification of a slave reception buffer read pointer. The master reception circular buffer is configured to receive slave-end data from the slave SoC and accordingly update a master reception buffer write pointer, and to update a master reception buffer read pointer after the master-end upper-layer circuit reads the slave-end data. The slave reception circular buffer is configured to receive the master-end data from the master SoC and accordingly update a slave reception buffer write pointer, and to update the slave reception buffer read pointer after a slave-end upper-layer circuit (e.g., a video playback circuit) of the slave SoC reads the master-end data. The slave transmission circular buffer is configured to receive the slave-end data from the slave-end upper-layer circuit and accordingly update a slave transmission buffer write pointer, and to update a slave transmission buffer read pointer according to an update notification of the master reception buffer read pointer. In this embodiment, the slave/master reception circular buffer is a duplicate of the master/slave transmission circular buffer; accordingly, the write pointers of the two corresponding buffers are substantially synchronous and the read pointers of the two corresponding buffers are substantially synchronous as well. Consequently, the read and write operations of the master/slave transmission circular buffer can be treated as the read and write operations of the slave/master reception circular buffer; therefore some conventional data reproducing procedure(s) for the data transmission can be omitted and the data transmission is accelerated.

An embodiment of the data transfer circuit of the present disclosure is capable of accelerating data transmission between two chips (e.g., two SoCs). This embodiment includes a first SoC (e.g., a video decoding SoC or a video playback SoC) including a first transmission circular buffer and a first reception circular buffer. The first transmission circular buffer is configured to receive first-end data from a first-end upper-layer circuit of the first SoC and accordingly update a transmission buffer write pointer, and to update a transmission buffer read pointer according to a read pointer update notification of a second SoC. The first reception circular buffer is configured to receive second-end data from the second SoC and accordingly update a reception buffer write pointer, and to update a reception buffer read pointer after the first-end upper-layer circuit reads the second-end data.

An embodiment of the data transfer method of the present disclosure is capable of accelerating data transmission between two chips (e.g., two SoCs). The embodiment is performed with a first SoC (e.g., a video decoding SoC or a video playback SoC), and includes the following steps: using a transmission circular buffer to receive first-end data from an upper-layer circuit of the first SoC and accordingly update a transmission buffer write pointer; transmitting the first-end data of the transmission circular buffer to a second SoC; updating a transmission buffer read pointer according to a read pointer update notification of the second SoC; using a reception circular buffer to receive second-end data of the second SoC and accordingly update a reception buffer write pointer; updating a reception buffer read pointer after the upper-layer circuit of the first SoC reads the second-end data of the reception circular buffer; and transmitting an update notification of the reception buffer read pointer to the second SoC.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

Figure 1:
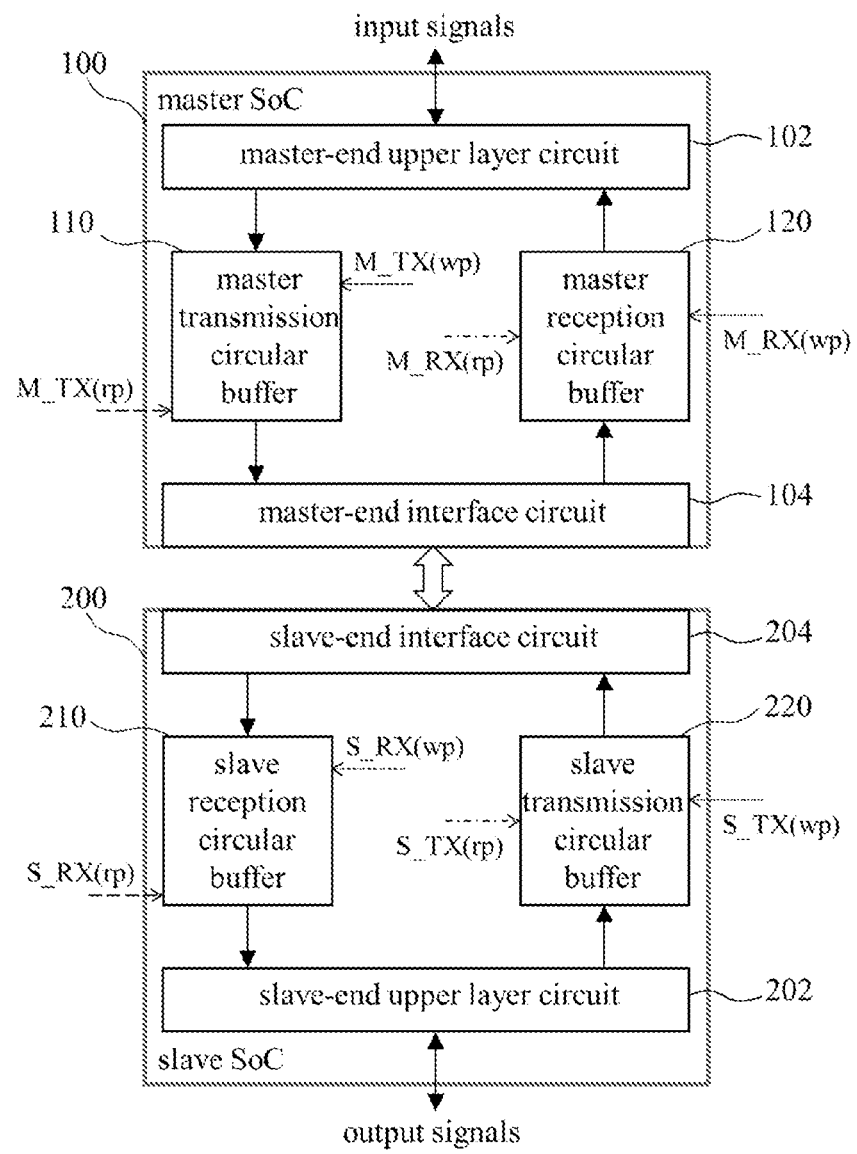
FIG. 1 shows an embodiment of the data transfer system of the present disclosure.

FIG. 1 shows an embodiment of the data transfer system of the present disclosure. The data transfer system 10 of FIG.

1 is capable of accelerating data transmission between two chips, and includes a master system-on-a-chip (SoC) 100 and a slave SoC 200. In this specification, the terms "master" and "slave" are used for description, and are not indicative of a subordinate relation between the master SoC 100 and the slave SoC 200; generally, the subordinate relation between the master SoC 100 and the slave SoC 200 is determined according to the transmission protocol to which the master SoC 100 and the slave SoC 200 conform. The master SoC 100 (e.g., a video decoding SoC) includes a master transmission circular buffer 110 and a master reception circular buffer 120. The slave SoC 200 (e.g., a video playback SoC) includes a slave reception circular buffer 210 and a slave transmission circular buffer 220. The write pointer of the slave reception circular buffer 210 and the write pointer of the master transmission circular buffer 110 change substantially synchronously, and the read pointer of the slave reception circular buffer 210 and the read pointer of the master transmission circular buffer 110 also change substantially synchronously. Similarly, the write pointer of the master reception circular buffer 120 and the write pointer of the slave transmission circular buffer 220 change substantially synchronously, and the read pointer of the master reception circular buffer 120 and the read pointer of the slave transmission circular buffer 220 change substantially synchronously. In light of the above, the master (slave) SoC 100 (200) can treat the read and write operations of the slave (master) reception circular buffer 210 (120) as the read and write operations of the master (slave) transmission circular buffer 110 (220); therefore some conventional data reproducing procedures for the data transmission between the master SoC 100 and the slave SoC 200 can be omitted and the data transmission is accelerated. It should be noted that the above-mentioned synchronous changes of two corresponding pointers should be understood as that: after a first change of a first pointer and before a second change of the first pointer, a first change of a second pointer should be complete and the first change of the second pointer should correspond to the first change of the first pointer. It should also be noted that each circular buffer alone in the embodiments of this specification is a known/self-developed circular buffer.

Please refer to FIG. 1. The master transmission circular buffer 110 is configured to receive master-end data (e.g., decoded image data) from a master-end upper-layer circuit 102 (e.g., a known/self-developed video decoding circuit for generating the master-end data according to input signals) of the master SoC 100, and accordingly update a master transmission buffer write pointer (M_TX(wp)); and after the master-end data are transmitted to the slave SoC 200, the master transmission circular buffer 110 is configured to update a master transmission buffer read pointer (M_TX(rp)) according to an update notification of a slave reception buffer read pointer (S_RX(rp)), wherein M_TX(wp) and M_TX(rp) are indicative of the write status of the master transmission circular buffer 110 and the read status of the master transmission circular buffer 110 respectively. The master reception circular buffer 120 is configured to receive slave-end data (e.g., a notification of a video playback completion, a notification of adjustment in image parameters (e.g., brightness, contrast), or a video synchronization calibration signal) from the slave SoC 200 and accordingly update a master reception buffer write pointer (M_RX(wp)); after the master-end upper-layer circuit 102 reads the slave-end data, the master reception circular buffer 120 is configured to update a master reception buffer read pointer (M_RX(rp)), wherein M_RX(wp) and M_RX(rp) are indicative of the write status of the master reception circular buffer 120 and the read status of the master reception circular buffer 120 respectively.

Please refer to FIG. 1. The slave reception circular buffer 210 is configured to receive the master-end data from the master SoC 100 and accordingly update a slave reception buffer write pointer (S_RX(wp)); and after a slave-end upper-layer circuit 202 (e.g., a known/self-developed video playback circuit for generating output signals according to the master-end data) of the slave SoC 200 reads the master-end data, the slave reception circular buffer 210 is configured to update the slave reception buffer read pointer (S_RX(rp)), wherein S_RX(wp) and S_RX(rp) are indicative of the write status of the slave reception circular buffer 210 and the read status of the slave reception circular buffer 210 respectively. The slave transmission circular buffer 220 is configured to receive the slave-end data from the slave-end upper-layer circuit 202 and accordingly update a slave transmission buffer write pointer (S_TX(wp)); and after the slave-end data are transmitted to the master SoC 100, the slave transmission circular buffer 220 is configured to update a slave transmission buffer read pointer (S_TX(rp)) according to an update notification of the master reception buffer read pointer (M_RX(rp)), wherein S_TX(wp) and S_TX(rp) are indicative of the write status of the slave transmission circular buffer 220 and the read status of the slave transmission circular buffer 220 respectively.

Please refer to FIG. 1. The master SoC 100 further includes: a master-end interface circuit 104 configured to transmit the master-end data to the slave SoC 200, receive the update notification of the slave reception buffer read pointer S_RX(rp) from the slave SoC 200, receive the slave-end data from the slave SoC 200, and transmit the update notification of the master reception buffer read pointer M_RX(rp) to the slave SoC 200. The slave SoC 200 further includes: a slave-end interface circuit 204 configured to receive the master-end data from the master SoC 100, transmit the update notification of the slave reception buffer read pointer S_RX(rp) to the master SoC 100, transmit the slave-end data to the master SoC 100, and receive the update notification of the master reception buffer read pointer M_RX(rp) from the master SoC 100. In this embodiment, both the master-end interface circuit 104 and the slave-end interface circuit 204 are known/self-developed Universal Serial Bus (USB) interface circuits, but the present invention is not limited thereto. The master-end interface circuit 104 and the slave-end interface circuit 204 can be other kinds of interface circuits such as known/self-developed Peripheral Component Interconnect Express (PCIe) interface circuits. It should be noted the master-end interface circuit 104 stores the slave-end data in the master reception circular buffer 120 directly without using any other buffers (i.e., any intervening buffers) in comparison with the prior art, so that a conventional procedure for reproducing the slave-end data with one or more intervening buffers is omitted; similarly, the slave-end interface circuit 204 stores the master-end data in the slave reception circular buffer 210 directly without using any other buffers (i.e., any intervening buffers) in comparison with the prior art, so that a conventional procedure for reproducing the master-end data with one or more intervening buffers is omitted.

Please refer to FIG. 1. In order to synchronize the read and write operations of the master transmission circular buffer 100 with the read and write operations of the slave reception circular buffer 210, the buffer size of the master transmission circular buffer 110 can optionally be equal to the buffer size of the slave reception circular buffer 210; in brief, the slave reception circular buffer 210 can be a duplicate of the master transmission circular buffer 110 for simplifying the above-mentioned synchronization. Similarly, in order to synchronize the read and write operations of the slave transmission circular buffer 220 with the read and write operations of the master reception circular buffer 120, the buffer size of the slave transmission circular buffer 220 can optionally be equal to the buffer size of the master reception circular buffer 120; in short, the master reception circular buffer 120 can be a duplicate of the slave transmission circular buffer 220 for simplifying the above-mentioned synchronization. It should be noted that if the buffer sizes of two corresponding buffers are known, the relation between pointers of the two corresponding buffers can be derived from the buffer sizes, and be used as the basis for synchronizing the pointers of the two buffers; accordingly, even though the buffer sizes of the two buffers are different, the synchronization can still be achieved. It should also be noted that if the data amount of the master-end data is greater (less) than the data amount of the slave-end data, the buffer size of the master transmission circular buffer 110 can optionally be greater (less) than the buffer size of the master reception circular buffer 120, and the buffer size of the slave reception circular buffer 210 can optionally be greater (less) than the buffer size of the slave transmission circular buffer 220, so as to meet the respective requirements for storing the master-end data and slave-end data in a cost-effective manner.

Please refer to FIG. 1. If the transmission protocol (e.g., USB protocol) between the master SoC 100 and the slave SoC 200 only permits the master SoC 100 to take the initiative, after the master SoC 100 transmits the master-end data to the slave SoC 200, the master SoC 100 can actively request the slave SoC 200 to provide the update notification of the slave reception buffer read pointer, and then update the master transmission buffer read pointer according to the update notification; in addition, before the master SoC 100 receives the slave-end data, the master SoC 100 can query the slave SoC 200 about the slave-end data, and accordingly request the slave SoC 200 to transmit the slave-end data to the master SoC 100.

Please refer to FIG. 1. Each of the master SoC 100 and the slave SoC 200 can be an embodiment of the data transfer circuit of the present disclosure. Since those having ordinary skill in the art can refer to the disclosure of the embodiment of FIG. 1 to appreciate the detail and modification of the embodiment of the data transfer circuit of the present disclosure, repeated and redundant description is omitted here.

Figure 2:
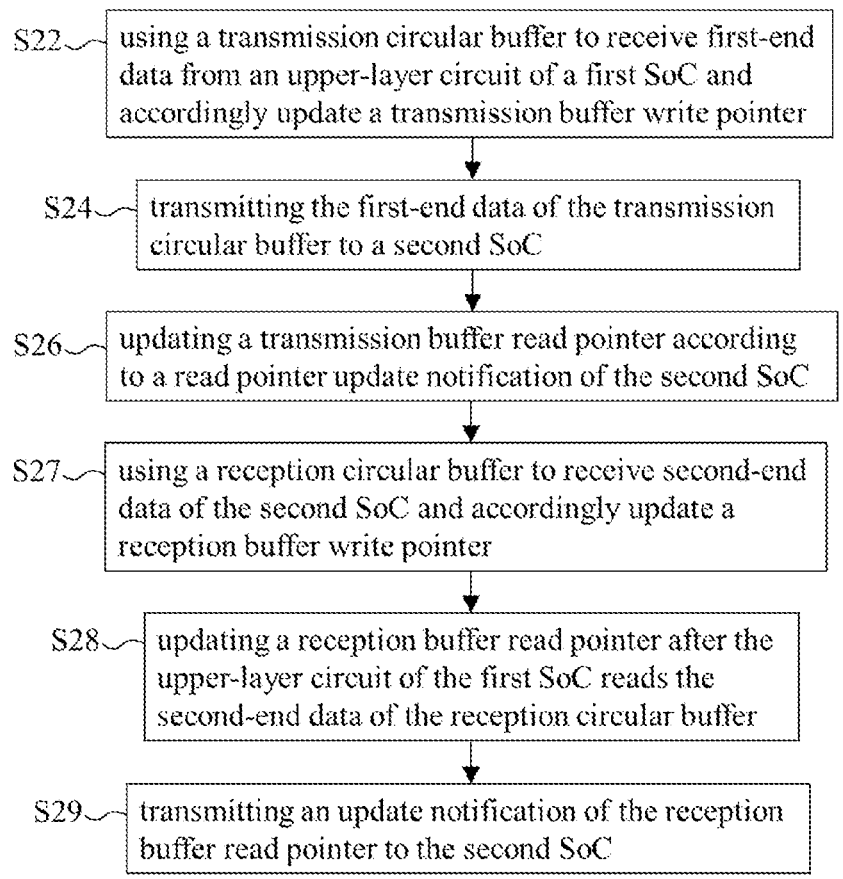
FIG. 2 shows an embodiment of the data transfer method of the present disclosure.

FIG. 2 shows an embodiment of the data transfer method of the present disclosure. This embodiment is capable of accelerating data transmission between two chips (e.g., the master SoC 100 and slave SoC 200 of FIG. 1), and is performed with a first SoC (e.g., the master SoC 100 or the slave SoC 200 of FIG. 1). The embodiment includes the following steps:

S22: using a transmission circular buffer to receive first-end data from an upper-layer circuit of the first SoC and accordingly update a transmission buffer write pointer;

S24: transmitting the first-end data of the transmission circular buffer to a second SoC;

S26: updating a transmission buffer read pointer according to a read pointer update notification of the second SoC;

S27: using a reception circular buffer to receive second-end data of the second SoC and accordingly update a reception buffer write pointer;

S28: updating a reception buffer read pointer after the upper-layer circuit of the first SoC reads the second-end data of the reception circular buffer; and S29: transmitting an update notification of the reception buffer read pointer to the second SoC.

Since those having ordinary skill in the art can refer to the disclosure of the embodiment of FIG. 1 to appreciate the detail and modification of the embodiment of FIG. 2, which means that the technical means of the embodiment of FIG. 1 can be applied to the embodiment of FIG. 2 in a logical way, repeated and redundant description is omitted here.

It should be noted that people having ordinary skill in the art can selectively use some or all of the technical means of any embodiment in this specification or selectively use some or all of the technical means of multiple embodiments in this specification to implement the present invention as long as such implementation is practicable; in other words, the way to implement the present invention can be flexible.

To sum up, the data transfer system, circuit, and method of the present disclosure can synchronize the read and write operations of one SoC with the read and write operations of another SoC to accelerate data transmission between the two SoCs.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A data transfer system capable of accelerating data transmission between two chips, comprising a master system-on-a-chip (SoC) and a slave SoC, wherein:
   the master SoC includes:
      a master transmission circular buffer configured to receive master-end data from a master-end upper-layer circuit of the master SoC and accordingly update a master transmission buffer write pointer, and to update a master transmission buffer read pointer according to an update notification of a slave reception buffer read pointer; and
      a master reception circular buffer configured to receive slave-end data from the slave SoC and accordingly update a master reception buffer write pointer, and to update a master reception buffer read pointer after the master-end upper-layer circuit reads the slave-end data; and
   the slave SoC includes:
      a slave reception circular buffer configured to receive the master-end data from the master SoC and accordingly update a slave reception buffer write pointer, and to update the slave reception buffer read pointer after a slave-end upper-layer circuit of the slave SoC reads the master-end data; and
      a slave transmission circular buffer configured to receive the slave-end data from the slave-end upper-layer circuit and accordingly update a slave transmission buffer write pointer, and to update a slave transmission buffer read pointer according to an update notification of the master reception buffer read pointer.

2. The data transfer system of claim 1, wherein:
   the master SoC further includes:
      a master-end interface circuit configured to transmit the master-end data to the slave SoC, receive the update notification of the slave reception buffer read pointer from the slave SoC, receive the slave-end data from the slave SoC, and transmit the update notification of the master reception buffer read pointer to the slave SoC; and the slave SoC further includes:
a slave-end interface circuit configured to receive the master-end data from the master SoC, transmit the update notification of the slave reception buffer read pointer to the master SoC, transmit the slave-end data to the master SoC, and receive the update notification of the master reception buffer read pointer from the master SoC.

3. The data transfer system of claim 2, wherein both the master-end interface circuit and the slave-end interface circuit are Universal Serial Bus (USB) interface circuits or Peripheral Component Interconnect Express (PCIe) interface circuits.

4. The data transfer system of claim 2, wherein the slave-end interface circuit stores the master-end data in the slave reception circular buffer without using any other buffers.

5. The data transfer system of claim 2, wherein the master-end interface circuit stores the slave-end data in the master reception circular buffer without using any other buffers.

6. The data transfer system of claim 1, wherein a buffer size of the master transmission circular buffer is equal to a buffer size of the slave reception circular buffer; and a buffer size of the master reception circular buffer is equal to a buffer size of the slave transmission circular buffer.

7. The data transfer system of claim 6, wherein the buffer size of the master transmission circular buffer is larger than the buffer size of the master reception circular buffer; and the buffer size of the slave reception circular buffer is larger than the buffer size of the slave transmission circular buffer.

8. The data transfer system of claim 1, wherein a buffer size of the master transmission circular buffer is larger than a buffer size of the master reception circular buffer; and a buffer size of the slave reception circular buffer is larger than a buffer size of the slave transmission circular buffer.

9. The data transfer system of claim 1, wherein after the master SoC transmits the master-end data to the slave SoC, the master SoC actively requests the slave SoC to provide the update notification of the slave reception buffer read pointer so that the master SoC updates the master transmission buffer read pointer accordingly; and before the master SoC receives the slave-end data, the master SoC actively queries the slave SoC about the slave-end data and accordingly requests the slave SoC to transmit the slave-end data to the master SoC.

10. The data transfer system of claim 1, wherein the master SoC is a video decoding chip, and the slave SoC is a video playback chip.

11. A data transfer circuit capable of accelerating data transmission between two chips, comprising:
a first system-on-a-chip (SoC) including:
a first transmission circular buffer configured to receive first-end data from a first-end upper-layer circuit of the first SoC and accordingly update a transmission buffer write pointer, and to update a transmission buffer read pointer according to a read pointer update notification of a second SoC; and a first reception circular buffer configured to receive second-end data from the second SoC and accordingly update a reception buffer write pointer, and to update a reception buffer read pointer after the first-end upper-layer circuit reads the second-end data.

12. The data transfer circuit of claim 11, wherein the first SoC further includes:
a first-end interface circuit configured to transmit the first-end data to the second SoC, receive the read pointer update notification from the second SoC, receive the second-end data from the second SoC, and transmit an update notification of the reception buffer read pointer to the second SoC.

13. The data transfer circuit of claim 12, wherein the first-end interface circuit is a Universal Serial Bus (USB) interface circuit or a Peripheral Component Interconnect Express (PCIe) interface circuit.

14. The data transfer circuit of claim 12, wherein the first-end interface circuit stores the second-end data in the first reception circular buffer without using any other buffers.

15. The data transfer circuit of claim 11, wherein a buffer size of the first transmission circular buffer is different from a buffer size of the first reception circular buffer.

16. The data transfer circuit of claim 11, wherein the first SoC is one of a video decoding chip and a video playback chip, and the second SoC is the other one of the video decoding chip and the video playback chip.

17. A data transfer method capable of accelerating data transmission between two chips, wherein the method is performed with a first system-on-a-chip (SoC) and includes following steps:
using a transmission circular buffer to receive first-end data from an upper-layer circuit of the first SoC and accordingly update a transmission buffer write pointer;
transmitting the first-end data of the transmission circular buffer to a second SoC;
updating a transmission buffer read pointer according to a read pointer update notification of the second SoC;
using a reception circular buffer to receive second-end data of the second SoC and accordingly update a reception buffer write pointer;
updating a reception buffer read pointer after the upper-layer circuit of the first SoC reads the second-end data of the reception circular buffer; and
transmitting an update notification of the reception buffer read pointer to the second SoC.

18. The data transfer method of claim 17, wherein the step of using the reception circular buffer to receive the second-end data of the second SoC stores the second-end data in the reception circular buffer directly without using any intervening buffers.

19. The data transfer method of claim 17, wherein a buffer size of the first transmission circular buffer is different from a buffer size of the first reception circular buffer.

20. The data transfer method of claim 17, wherein the first SoC is one of a video decoding chip and a video playback chip, and the second SoC is the other one of the video decoding chip and the video playback chip.

* * * * *